3,215,508
GAS DISTRIBUTOR
Loyd W. Piester, New Martinsville, W. Va., assignor to Pittsburgh Plate Glass Company, Pittsburgh, Pa., a corporation of Pennsylvania
Filed Mar. 15, 1962, Ser. No. 179,898
5 Claims. (Cl. 23—288)

The present invention relates to the oxychlorination of hydrocarbons. More particularly, the present invention relates to improvements in apparatus for conducting oxychlorination reactions in a fluidized bed reaction zone.

In the oxychlorination of various hydrocarbons and hydrocarbon chlorides in fluidized bed reaction zones, considerable difficulty is often encountered in properly mixing the various reactants employed to satisfactorily conduct the oxychlorination reactions with maximum efficiency. In addition, quite often explosive mixtures of reactant gases are employed which requires specialized techniques in the mixing of the reactant gases prior to their feeding to the reaction zone. Thus, it is often necessary to premix the hydrocarbons and/or chlorohydrocarbon feed with the chlorinating agent prior to the introduction of the oxygen containing gas which is necessary for the fluidized bed catalytic reaction to take place.

In accordance with the present invention, a novel gas distribution apparatus is provided which permits ready mixing of the reactant gases employed in a given oxychlorination reaction while at the same time minimizing many of the problems formerly associated therewith. Thus, explosive conditions are avoided by utilization of the present apparatus, good mixing of the reactant gases takes place, and problems caused by carbonization and other similar phenomena are substantially obviated.

Figure 1:
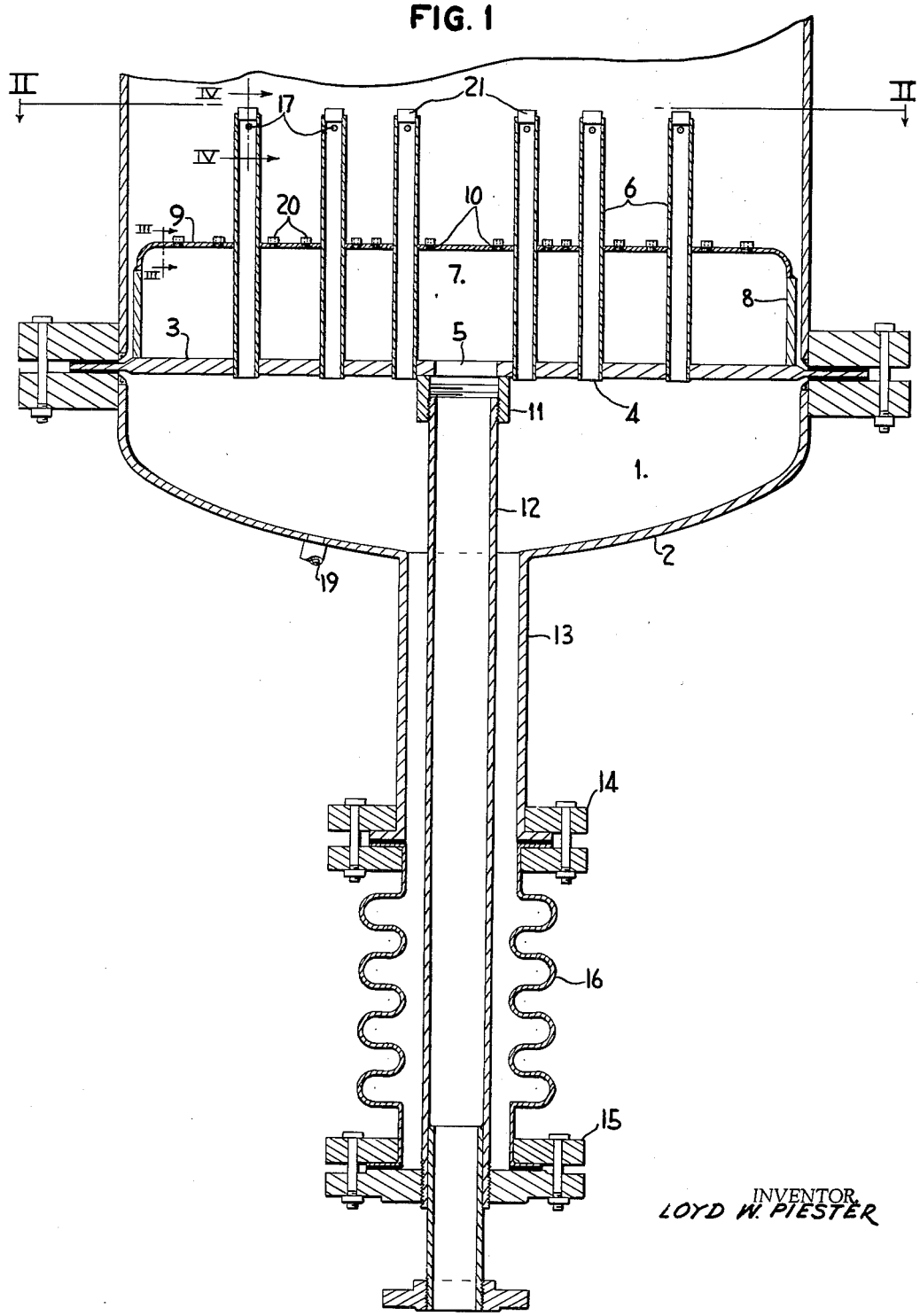

For a more complete understanding of the present invention, reference is made to the accompanying drawing in which:

FIGURE 1 represents a longitudinal section of the distributor plate of a fluidized bed reactor employed in the oxychlorination of hydrocarbons and/or chlorohydrocarbons.

Figure 2:
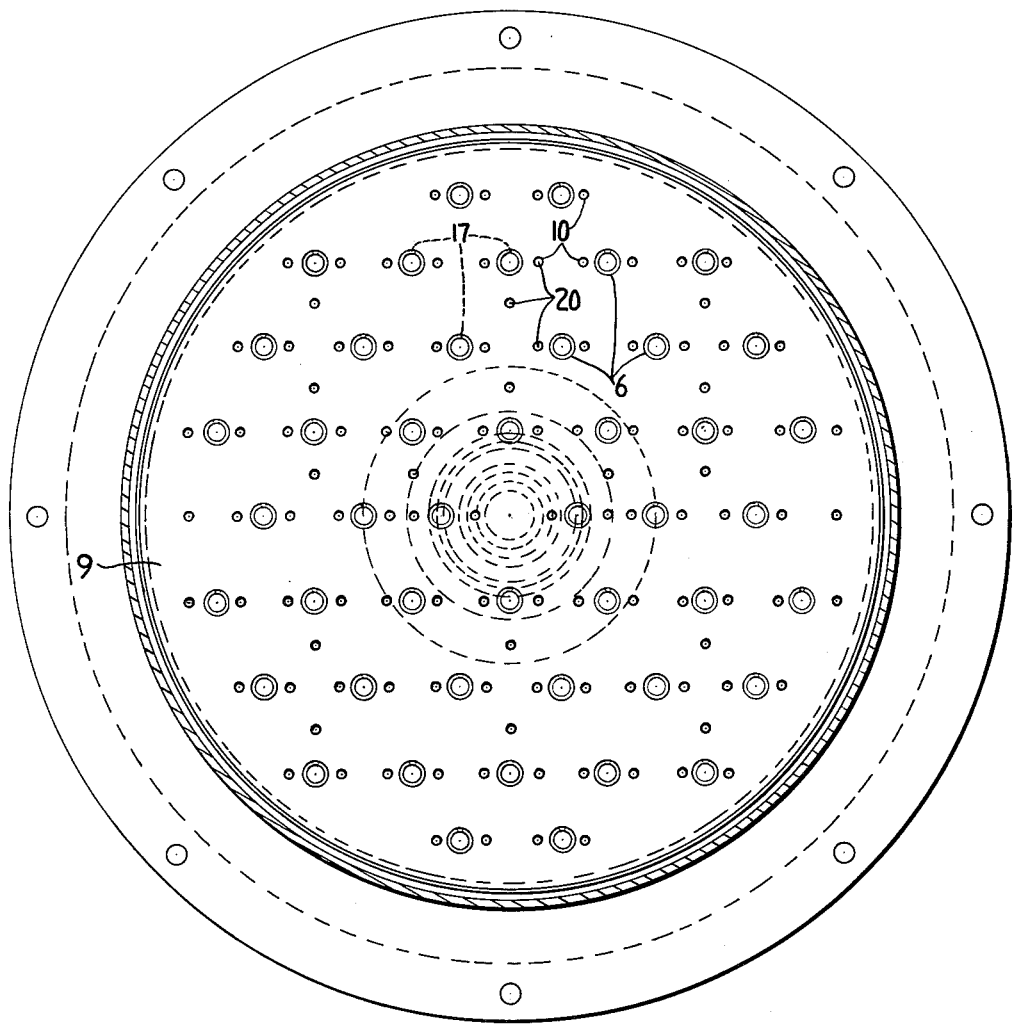
Figure 3:
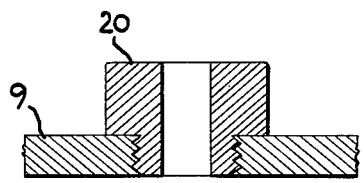
Figure 4:
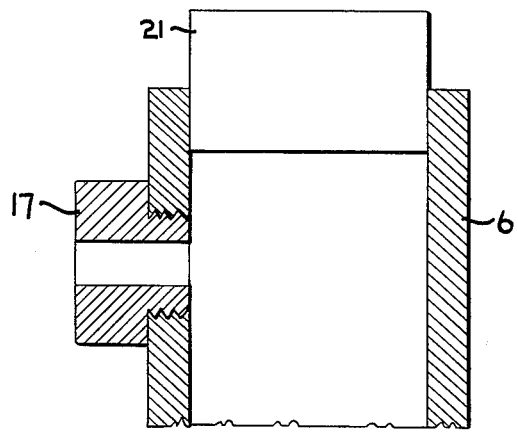

FIGURE 2 is a cross section of the distributor plate of FIGURE 1 taken along lines II—II. FIGURE 3 is an enlarged cross section of the orifice 20 of FIGURE 1 taken along lines III—III. FIGURE 4 is an enlarged cross section of orifice 17 taken along lines IV—IV.

With reference to the drawing, in FIGURE 1 there is shown chamber 1 formed by a steel plate 2 which circumferentially encloses the chamber 1 and serves as the bottom and side portions of that chamber. The roof of the chamber is formed by a plate 3 having a plurality of drilled holes 4 of uniform size and a large central opening 5. The drilled openings or holes 4 have inserted and welded therein metal tubes 6. Located above the chamber 1 is a second chamber 7 which utilizes the metal plate 3 as the floor of the chamber. The holes 4 have the elements 6 inserted therein and these elements traverse this second chamber. A side member for the chamber is provided by a metal plate 8 which encompasses the entire circumference of the chamber. If desired, in lieu of a separate plate, member 8 may be pressed out as part of element 9. The upper portion of the chamber is provided with a plate 9 which covers the surface and is in communication with the side member 8. The surface of the cover member 9 is preferably drilled with a plurality of holes or orifices 10 which communicate with the chamber 7. In lieu of this arrangement, the plate may be drilled and removable orifices 20 inserted in the drilled plate.

The central opening 5 located in plate 3 and which is in communication with chamber 7 is provided on its lower surface with a coupling member 11. This coupling member is in communication with an externally threaded shaft member 12 which may be joined to the coupling member 11 by the internal threading on the coupling. The shaft 12 is surrounded at its lowermost portions after traversing the chamber 1 by a steel shell or cylindrical plate 13 and is held in place by two flanges 14 and 15 which have placed between them an expansion joint 16.

As can be seen from an examination of FIGURE 2 the openings 10 in the upper plate 9 of the distributor plate are drilled openings and drilled preferably on a triangular pitch pattern. In the preferred construction, as shown in FIGURE 2, at least one small opening 10 is provided in the area of each element 6 so that the gases passing through the openings associated with the element 6 are mixed with the effluent gas coming from the opening 17 in each element 6. The element 6 is in communication with the lowermost chamber 1 and terminates at a point at least 3 inches above the top member 9. The openings 17 are located substantially above the top member 9 and are on the sides of the tubes 6 below the plugs 21 located at the end of the tubes so that the gas emerging from these holes contacts the uprising gases at almost right angles. While this is preferred for the maximum mixing of the uprising gases and the gases emerging from the openings 17, the openings may be placed so that the gas contained in the tubes 6 contacts the upwardly rising gases either co-currently, downwardly or tangentially. If co-current contact is desired, the orifices or openings 17 are located on the upper surface of the plugs 21. Located in the bottom portion of the element 2 of the distribution system of the present invention is an opening 19 which permits the admission of gas to the chamber 1. This opening, if desired, can also be placed anywhere along the shaft or collar 13. Similarly, while one gas feed opening only is shown, a plurality may be used where desired.

In the operation of the present device, the entire gas distributing element above described and shown in FIGURES 1 and 2 is utilized as the bottom portion of a fluidized bed reactor. The plate 9 serves as the catalyst support plate for the catalyst material employed as the fluidized bed of particulate matter. In starting up the operation, the distribution apparatus is placed in the reactor, the catalyst is placed on top of it, and gas is admitted to the central opening 5 of the chamber 7 via the central opening in the element 12. The gas is admitted at a velocity sufficient to fluidize the particulate matter contained in the bed and once fluidization has been established the auxiliary gas is admitted through opening 19 into the chamber 1. From chamber 1 by communication through the element 6 via openings 4 and 17 this auxiliary gas is mixed in the reaction chamber to provide the last gaseous element for the oxychlorination reaction. In conducting the reactions in accordance with the teachings of this invention, the chlorinating agent and the hydrocarbon and/or chlorohydrocarbon feed to be chlorinated are admitted through conduit 12 and opening 5 to the chamber 7. The pressure drop across the openings of the upper portion of chamber 7 is normally about 2 to 3 p.s.i.g. Once the bed is in a fluidized state, oxygen or air or any other oxygen containing gas is admitted to chamber 1 through opening 19 and by communication through the openings 4 and 17 of the elements 6 the oxygen is mixed with the hydrocarbon and/or chlorohydrocarbon and chlorinating agent at a substantial distance up inside of the bed.

Preferably in conducting this reaction, the oxygen is admitted to the bed at a distance from the bottom of the reaction zone somewhere within the lower one-third, typically the lower 10 percent of the fluidized bed as measured in the expanded state. Operating in this manner, the hazards of explosion are considerably reduced or eliminated.

Thus, for example, in feeding ethylene, HCl and oxygen in an oxychlorination fluidized bed reaction zone the ethylene and hydrogen chloride are admitted to the reaction zone through the openings 10 in the catalyst support plate 9 of the chamber 7. The oxygen is introduced into the reaction zone at a distance considerably above the ethylene admission and by the time the oxygen contacts the ethylene, the ethylene has been thoroughly mixed with the hydrogen chloride to thereby prevent any explosive mixture build up of ethylene and oxygen. In a similar fashion operating with materials such as ethylene dichloride, oxygen and HCl or chlorine, explosions are further prevented by the admixture of the hydrocarbon and/or chlorohydrocarbon prior to the admission of the main portion of the oxygen stream. While the apparatus has been described with reference to situations where oxygen is admitted through the elements 6 to the fluidized reactor bed it is, of course, understood that a portion of the oxygen may be introduced with the hydrocarbon and chlorine through the distribution centers 10 located in the upper portion of the distributor plate. This has some beneficial effect with reference to certain specific hydrocarbons as has been described in the copending application of Lester E. Bohl, Serial No. 28,550, filed on May 12, 1960, now abandoned.

In general, however, in dealing with hydrocarbons and/or chlorohydrocarbons and oxygen it is desirable to admit the major portion of the oxygen content of the reaction feed at a level in the bed considerably above the level of admission of the hydrocarbon and/or chlorohydrocarbon and the chlorinating agent.

The apparatus of the present invention has a particular advantage in that a unitary device is provided which has the benefits of having everything in a stable, stationary condition. The entire element can be removed at one time to replace parts, to drill out plugged holes, or to replace orifices with a minimum amount of shut-down time for the reactor. Because of the unitary nature of the device, even distribution of gases is readily accomplished since there is no deviation or fluctuation of the device during operation. Thus, with relationship to each other, the openings for the admission of oxygen containing gas and the openings for the admission of the chlorine containing gases and the hydrocarbons are stationary with respect to each other.

The elements 6 as shown in the drawing are welded to the plates 3 and 9. While welding of the units 6 to the upper and lower plates forms a preferred embodiment of the present invention, it is, of course, to be understood that this is merely a matter of choice. If desired, threads could be provided on the elements 6 and the elements could be screwed into internal threads located in the lower and upper plates. A pressure fit could also be employed if desired. The main consideration in placing the elements 6 in the upper and lower plates of the distribution zone is to provide a stationary location of the element with respect to the drilled holes or orifices in the upper plate and which will not readily give rise to distortion of the orifices or holes in the elements 6 with respect to the orifices or holes drilled in the plate 9. This entire construction provides maximum strength to the assembled bottom. Elements 6 allow the plates 9 and 3 to be much thinner than otherwise possible, thereby considerably reducing the weight of the bottom assembly and facilitating its removal and handling.

In constructing the device of the present invention, it is desirable to employ a metal which will not under the conditions of operation readily corrode or react with the materials being fed. Preferably, in the constructing of this device all elements exposed to the atmosphere of the fluidized bed reaction zone are constructed of nickel. While drilled holes or orifices 17 and 10 have been shown respectively in the elements 6 and 9 for the admission of gases to the reaction zones, nozzles or orifices (20) may be provided in these elements to thereby render the gas distribution holes removable. In this latter case, threaded holes may be supplied in one or both elements 9 and 6 and a nipple having an orifice of predetermined size inserted in the threaded hole. An orifice of this type permits ease of operation when the reactor conditions are to be changed since it may be easily removed and replaced with another nipple having a different orifice size to produce different products or to alleviate an undesirable bed condition.

For a more complete understanding of the present invention, reference is made to the following examples, which are illustrative of one form of the apparatus of the present invention employed in the operation of the fluidized bed reactor for the production of a chlorinated hydrocarbon from a hydrocarbon feed, HCl, and an oxygen containing gas.

*Example 1*

A 24-inch internal diameter nickel reactor is employed as a fluidized bed reactor for the reaction of ethylene, HCl and oxygen to provide an ethylene dichloride product stream. The reactor is 24 feet in height and contains in the lower third of the reactor a nickel cooling coil of serpentine shape having a cooling surface of 75 square feet. In the upper portion of the reactor is placed a 5-inch internal diameter cyclone having a dip leg extending down into the bed to a point 4 inches from the top of the distributor plate. The bottom portion of the reactor is fitted with a distributor plate 24 inches in diameter. The distributor plate contains two chambers, the lower chamber being approximately 6 inches in depth at its deepest point and about 2 inches at the periphery. The roof portion of the lower chamber is covered with a nickel plate 28½ inches in diameter and ⅜ inch thick. This plate is provided with 46 drilled holes 1 inch in diameter. Into the drilled holes are fitted ⅝-inch internal diameter nickel tubes 9 inches long. These nickel tubes terminate 4½ inches above the surface of a second plate through which the tubes extend vertically. This second plate is affixed to the lower plate by communication with a side member 4 inches wide and 23 inches in diameter, fabricated of nickel and attached to the lower plate. The ⅛-inch drilled plate forming the roof of the upper chamber has a plurality of small holes drilled therein, the exact number being 112. In the middle of the lower plate forming the bottom of the upper chamber, is a drilled hole 2 inches in diameter having a coupling attached thereto, the coupling having an opening of approximately 2 inches. Fitted to the coupling is a 2-inch nickel pipe, fitted with external threads and screwed into the coupling, the pipe being 2 feet 5¼ inches in length. The pipe is secured to the base member of the upper chamber and by two flanges to a 4-inch diameter schedule 80 steel pipe in communication with the lower portion of the lower chamber. Between the two flange members is located a 4-inch diameter packless expansion joint with corrugations for a total movement of ½ inch.

The catalyst is prepared by dissolving 29 pounds of $CuCl_2 \cdot 2H_2O$ and 15.2 pounds of HCl in 5.3 gallons of distilled water. A 10-inch internal diameter reactor is charged with 100 pounds of 30 to 60 mesh (U.S. Sieve Series) Florex (a calcined fuller's earth sold by the Floridin Corporation). The Florex particles are fluidized in the reactor by blowing warm air up through the 100-pound bed of particles at a superficial linear velocity of 0.5 feet per second. The temperature of the bed is maintained at 220° F. and the catalyst containing solution is added to the bed dropwise until the entire 5.3 gallons of solution are added. The reactor is shut down when the water of solution of the catalyst solution no longer comes off the reactor as overhead.

From catalyst prepared in this manner a fluidized bed 8 feet in depth is used. The ethylene and HCl are admitted to the reactor through the central opening in the upper chamber of the distribution plate through the elongated tube communicating with the coupling in the floor of the upper chamber of the distribution system. Oxygen is admitted to the reaction zone through an opening in the floor of the lower chamber and is distributed to the bed via the nickel pipes located in the 46 openings contained in the bottom member of the upper chamber of the distribution zone. The temperature of the reaction zone is maintained at 550° F. during the reaction. The molar feed ratio of ethylene to HCl to oxygen during the runs is maintained at 1.0 to 2.03 to 0.61. On completion of the runs ethylene utilization is typically 93.4 percent, HCl utilization is typically 93.9 percent and ethylene dichloride yields are 89.3 mole percent based on the ethylene fed.

*Example II*

Utilizing the equipment and catalyst of Example I, ethylene dichloride and HCl are fed to the upper chamber of the distribution zone to the gas distributor through the central opening by way of the pipe attached to the coupling located at this opening. Oxygen is fed to the lower portion of the distribution chamber and is distributed through the nickel pipes located in the 46 drilled holes to the reaction zone at a distance approximately 4½ inches above the distributor plate. Operating the system in this manner at atmospheric pressure and a temperature of 800° F. to 840° F., perchloroethylene and trichloroethylene are produced. A molar feed ratio of ethylene dichloride to HCl to oxygen of 1.0 to 1.1 to 1.3 is maintained during the reaction. On completion of the run ethylene dichloride utilization is typically 82.7 percent, HCl utilization is typically 73 percent. Trichloroethylene and perchloroethylene productivity is typically 66 mole percent basis the ethylene dichloride fed.

As can be readily seen from the above examples, utilizing the apparatus of the present invention, successful oxychlorination of the reactants was accomplished with a minimum of burning and difficulty encountered. At no time during the operations were there any explosions of any character and the gas mixing effect was considered excellent.

While the invention has been described with reference to certain specific examples, it is, of course, to be understood that the invention is not to be thereby limited except insofar as appears in the accompanying claims.

I claim:

1. In a fluid bed catalytic reactor a gas distributor located at the bottom thereof, said distributor comprising a top, a bottom and side walls, a plate positioned between the top and bottom and in communication with the side walls which forms two superimposed chambers between the top and bottom, the uppermost chamber being formed by the top of the distributor, said plate and side members affixed to said top and said plates, a hollow tubular member traversing said plate and said top, said tubular member being in communication with the lowermost of said two chambers and terminating at a point at least 3 inches above said top, an orifice located in said tubular member at a point at least 3 inches above said top, a plurality of orifices located in said top, an opening in said plate communicating with a closed conduit which traverses the lowermost chamber, a first means for introducing gas through said conduit to the uppermost chamber and a second means for introducing gas into the lowermost chamber.

2. The apparatus of claim 1 wherein the orifices in said tubular member and in said top member are removable.

3. In a fluid bed catalytic oxychlorination reactor a gas distributor located at the bottom and comprising a top, a bottom and side members, a partition positioned between said top and bottom and in communication with said side members thereby forming two superimposed gas chambers between the top and bottom, the uppermost chamber being formed by the top of the distributor, said plate and side members affixed to said top and said plate, a plurality of hollow tubular gas conduits traversing said partition and said top in a direction perpendicular with respect to the partition and top, each of said conduits terminating at a point substantially above the surface of said top and being provided with an orifice located at least 3 inches above said top, the lower end of each of said conduits terminating at or below the surface of said partition and communicating with the lowermost of said two chambers, means to admit gas to said lower chamber and pass it through said conduits, a plurality of gas orifices in said top, a gas opening in said partition in communication with the uppermost chamber and means to pass gas through said opening to said uppermost chamber.

4. The apparatus of claim 3 wherein the orifices on said top are removable.

5. The apparatus of claim 3 wherein the orifices of said top and said conduits are removable.

References Cited by the Examiner

UNITED STATES PATENTS

| | | | |
|---|---|---|---|
| 2,562,813 | 7/51 | Ogorzaly et al. | 75—26 X |
| 2,690,962 | 10/54 | Clarke | 23—288.3 |
| 2,838,577 | 6/58 | Cook et al. | 260—622 X |
| 2,841,476 | 7/58 | Dalton | 23—288.3 X |
| 2,901,332 | 8/59 | Randall | 23—288.3 |
| 2,990,260 | 6/61 | Mungen | 23—288.3 |
| 3,053,642 | 9/62 | Huntley et al. | 23—288.3 |

MORRIS O. WOLK, *Primary Examiner.*